(12) United States Patent
Akita et al.

(10) Patent No.: US 8,821,022 B2
(45) Date of Patent: Sep. 2, 2014

(54) SLIDING BEARING AND CONSTRUCTION MACHINE PROVIDED WITH SAME

(75) Inventors: Hideki Akita, Ibaraki (JP); Osamu Gokita, Ibaraki (JP); Shigeyuki Sakurai, Ibaraki (JP); Yasuchika Nagai, Ibaraki (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 13/978,294

(22) PCT Filed: Dec. 5, 2011

(86) PCT No.: PCT/JP2011/078071
§ 371 (c)(1),
(2), (4) Date: Jul. 3, 2013

(87) PCT Pub. No.: WO2012/093536
PCT Pub. Date: Jul. 12, 2012

(65) Prior Publication Data
US 2013/0279835 A1    Oct. 24, 2013

(30) Foreign Application Priority Data

Jan. 7, 2011 (JP) ................. 2011-002134

(51) Int. Cl.
| | |
|---|---|
| F16C 33/02 | (2006.01) |
| F16C 11/04 | (2006.01) |
| F16C 33/12 | (2006.01) |
| C22C 1/08 | (2006.01) |
| B22F 3/11 | (2006.01) |
| F16C 33/10 | (2006.01) |
| C22C 38/00 | (2006.01) |
| B22F 5/10 | (2006.01) |
| E02F 9/00 | (2006.01) |
| F16C 17/02 | (2006.01) |

(52) U.S. Cl.
CPC ............ *E02F 9/006* (2013.01); *F16C 2350/26* (2013.01); *F16C 11/045* (2013.01); *F16C 33/128* (2013.01); *C22C 1/08* (2013.01); *B22F 3/1146* (2013.01); *F16C 33/102* (2013.01); *C22C 38/00* (2013.01); *B22F 5/10* (2013.01); *F16C 17/02* (2013.01); *Y10S 384/902* (2013.01)
USPC ........................................ 384/279; 384/902

(58) Field of Classification Search
CPC .. F16C 11/045; F16C 2350/26; F16C 33/128; F16C 33/102; F16C 17/02; C22C 1/08; C22C 38/00; B22F 3/1146; B22F 5/10; E02F 9/006
USPC ........... 384/279, 902; 428/564, 550, 566, 639
See application file for complete search history.

(56) References Cited

U.S. PATENT DOCUMENTS 4,233,071 A * 11/1980 Bierlein et al. ................. 75/231
(Continued)

FOREIGN PATENT DOCUMENTS

JP            61-119815 A     6/1986
(Continued)

OTHER PUBLICATIONS
Machine Translation of JP2009-041659 dated Feb. 26, 2009.*
(Continued)

*Primary Examiner* — Alan B Waits
(74) *Attorney, Agent, or Firm* — Volpe and Koenig, P.C.

(57) ABSTRACT

Provided are a novel sliding bearing and a construction machine provided with same, the sliding bearing being capable of maintaining an excellent sliding performance over a long period of time and exhibiting an excellent strength. A sliding bearing includes at least a brush and a shaft part, the shaft part being provided with a grease feeding pathway for feeding grease from the exterior to the sliding surfaces of the shaft part and the bush, the bush being formed from a porous sintered metal, and a decomposition catalyst being adhered to the sliding surface of the bush.

9 Claims, 5 Drawing Sheets

(56) References Cited

U.S. PATENT DOCUMENTS

| | | | |
|---|---|---|---|
| 4,251,182 A * | 2/1981 | Schroeder | 414/723 |
| 5,044,812 A * | 9/1991 | Ardelt et al. | 403/154 |
| 5,630,673 A * | 5/1997 | Krzywanos et al. | 403/158 |
| 6,283,667 B1 * | 9/2001 | Neitzel | 403/158 |
| 6,746,154 B2 * | 6/2004 | Greene et al. | 384/276 |
| 6,854,183 B2 * | 2/2005 | Greene et al. | 29/898.058 |
| 6,962,458 B2 * | 11/2005 | Takayama et al. | 403/34 |
| 7,766,433 B2 * | 8/2010 | Mulligan et al. | 305/103 |
| 8,430,593 B2 * | 4/2013 | Gokita | 403/151 |
| 2003/0150140 A1 * | 8/2003 | Takayama et al. | 37/458 |
| 2004/0060210 A1 * | 4/2004 | Nishimura et al. | 37/465 |
| 2004/0228676 A1 * | 11/2004 | Oertley | 403/154 |
| 2007/0242912 A1 * | 10/2007 | Tanaka et al. | 384/463 |
| 2011/0044837 A1 * | 2/2011 | Hamada et al. | 419/27 |
| 2011/0249923 A1 * | 10/2011 | Lim et al. | 384/279 |
| 2012/0201962 A1 * | 8/2012 | Kawata et al. | 427/346 |
| 2013/0084203 A1 * | 4/2013 | Fukae et al. | 419/11 |
| 2014/0087210 A1 * | 3/2014 | Keane et al. | 428/810 |

FOREIGN PATENT DOCUMENTS

| | | |
|---|---|---|
| JP | 04-087711 U | 7/1992 |
| JP | 08-105444 A | 4/1996 |
| JP | 09-141024 A | 6/1997 |
| JP | 2832800 B2 | 10/1998 |
| JP | 11-009924 A | 1/1999 |
| JP | 2004-360731 A | 12/2004 |
| JP | 2009-041659 A | 2/2009 |
| JP | 4514416 B | 5/2010 |
| JP | 2011-069486 A | 4/2011 |

OTHER PUBLICATIONS

Machine Translation of JP 11-9924 dated Jan. 19, 1999.*

* cited by examiner

SLIDING BEARING AND CONSTRUCTION MACHINE PROVIDED WITH SAME

TECHNICAL FIELD

The present invention relates to a sliding bearing that is used for a wide variety of general machines, and particularly to a sliding bearing that can be used under severe lubrication conditions including high contact pressure and a slow speed sliding (e.g., a sliding bearing that is used in a construction machine such as hydraulic excavator or power shovel), and also relates to a construction machine equipped with such sliding bearings.

BACKGROUND ART

In general, a construction machine such as a hydraulic excavator has a number of sliding bearings that are used under conditions including high contact pressure and slow speed sliding. For example, as shown in FIG. 5, a conventional hydraulic excavator 200 is configured to have an arm 210, with a bucket 220 being rotatably connected to a distal end of the arm 210. The arm and bucket are driven by a plurality of hydraulic cylinders 230 respectively. Coupling portions between the arm 210 and bucket 220 as well as ends of the hydraulic cylinders 230 are rotatably supported by sliding bearings 300 respectively.

During excavation, the sliding bearings 300 used at the above-described positions are subjected to extremely large contact pressure at sliding surfaces between bushes and shaft parts in the sliding bearings 300, and the bushes and shaft parts slide with respect to each other at a slow speed. Thus, the contact surfaces (sliding surfaces) between the bushes and shaft parts encounter severe lubrication conditions, and therefore seizure, scratching, uneven wear and other problems are likely to occur due to shortage of lubrication.

To avoid these problems, the prior art proposes, as disclosed in the below-mentioned Patent Documents 1 and 2, a porous sintered alloy bush that is used as a bush in sliding contact with the shaft part and that includes Fe and Cu as its major components. The sintered alloy bush is impregnated with high viscosity lubrication oil beforehand, so that the impregnated lubrication oil seeps onto the sliding surface under pressure and friction heat during sliding. This prevents the shortage of the lubrication oil at the sliding surface and related problems.

LIST OF PRIOR ART REFERENCES

Patent Documents

PATENT DOCUMENT 1: Japanese Patent No. 2832800
PATENT DOCUMENT 2: Japanese Patent No. 4514416

SUMMARY OF THE INVENTION

Problems to be Solved by the Invention

However, when a sintered alloy bush that is impregnated with lubrication oil beforehand is used, there is a limitation on an impregnation capacity (volume) for the lubrication oil. As such, it is necessary to frequently replace the sintered alloy bush with a new sintered alloy bush, which is also impregnated with lubrication oil, before the lubrication oil is used up. In order to avoid this, the porosity of the sintered alloy bush may be increased to accommodate a larger amount of lubrication oil. However, this approach will considerably deteriorate the strength of the bush and would become a cause of breakage. In addition, workload is required to impregnate the bush with the lubrication oil beforehand, and handling of such bush is difficult because the impregnated lubrication oil may scatter to the surroundings when, for example, the bush is installed.

The present invention was developed to address these problems, and its object is to provide a novel sliding bearing that can maintain an excellent sliding performance over a long period of time without bush replacing work and oil impregnating work and can exhibit an excellent strength, and to provide a construction machine equipped with such sliding bearings.

Means to Solve the Problems

In order to address the problems, a first aspect of the present invention provides a sliding bearing that includes a brush formed from a porous sintered metal, a shaft part inserted in an axial hole of the bush to slide with respect to the bush, grease for lubricating sliding surfaces of the shaft part and the bush, a grease feeding pathway formed in the shaft part for feeding the grease from the exterior to the sliding surfaces of the shaft part and the bush, and a decomposition catalyst provided in the sliding surface of the bush for decomposing the grease to separate a base oil.

Such configuration can feed the grease, which serves as a lubrication agent, to the sliding surfaces of the shaft part and the bush through the grease feeding pathway from the outside, and the grease directly penetrates the bush, which is the porous sintered metal, and is retained in the pores of the bush. Also, the decomposition catalyst at the sliding surface of the bush decomposes the grease supplied to the sliding surface of the bush and separates the base oil from the grease so that the base oil penetrates the bush from the sliding surface of the bush and is preserved in the pores of the bush.

Accordingly, the lubrication oil does not run out even if bush replacing work and oil impregnating work are not carried out, and therefore it is possible to maintain excellent lubrication performance for a long period of time. Further, it is unnecessary to increase the porosity of the sintered metal, which is used as the bush, for the purpose of increasing an amount of oil content in the sintered metal, and therefore the sintered metal can have excellent strength. Moreover, because it is not necessary to impregnate the bush with the lubrication oil beforehand, the lubrication oil does not scatter to the surroundings when the bush is installed, and this makes the handling easy. Preferably the grease used in the present invention may include at least a base oil and a soap, which is a thickening agent, in order to enable the decomposition catalyst to decompose the soap or the thickening agent, and remove the base oil from the grease.

A second aspect of the present invention provides another sliding bearing, wherein the bush of the first aspect of the present invention is a porous sintered metal that has porosity of 2 to 10 Vol %.

With such configuration, the porosity of the bush that slides relative to the shaft part is smaller than a conventional sintered body, and therefore the bush can have greater strength than the conventional structure. The bush porosity is set to between 2 Vol % and 10 Vol % because the strength significantly drops if the porosity is over 10 Vol %, and an impregnation capacity or volume for a lubrication agent dramatically decreases and sufficient lubrication performance cannot be expected if the porosity is less than 2 Vol %.

A third aspect of the present invention provides another sliding bearing, wherein the bush of the first or second aspect of the present invention has an inorganic fine powder adhered to the sliding surface of the bush, the inorganic fine powder possessing an oil absorption property.

With such configuration, the grease supplied on the sliding surface of the bush or the base oil separated from the grease is absorbed into the bush by the oil-absorbing inorganic fine powder, so that the grease or base oil efficiently penetrates the bush and is retained in the pores of the bush.

A fourth aspect of the present invention provides another sliding bearing, wherein the inorganic fine powder of the third aspect of the present invention includes or (substantially) consists of ceramic particles.

The wear and abrasion resistance of the sliding surface of the bush is further increased by employing the ceramic particles, which have a high degree of strength, as the inorganic fine power to be adhered to the sliding surface of the bush.

A fifth aspect of the present invention provides another sliding bearing, wherein the inorganic fine powder of the third aspect of the present invention includes or (substantially) consists of sulfur compound particles.

The slidability (lubrication property) of the sliding surface of the bush is further improved by employing the sulfur compound particles as the inorganic fine powder to be adhered to the sliding surface of the bush.

A sixth aspect of the present invention provides another sliding bearing, wherein the inorganic fine powder of the third aspect of the present invention is a compound of the ceramic particles and sulfur compound particles.

The wear and abrasion resistance and the slidability (lubrication property) of the sliding surface of the bush is further improved by employing the compound of the ceramic particles and the sulfur compound particles as the inorganic fine powder to be adhered to the sliding surface of the bush.

A seventh aspect of the present invention provides another sliding bearing, wherein the inorganic fine powder of the third aspect of the present invention is caused to adhere to the sliding surface of the bush with a binder.

With such configuration, it is possible to securely adhere the inorganic fine powder to the sliding surface of the bush and cause the binder itself to absorb the base oil for retention of the base oil.

An eighth aspect of the present invention provides a construction machine equipped with a sliding bearing that is configured to be used under a high contact pressure (50 MPa or more) at a slow sliding speed (3.0 m/min or less), the sliding bearing being selected from one of the above-mentioned aspects of the present invention.

When one of the sliding bearings according to the above-mentioned aspects is used as the sliding bearing placed under extremely difficult lubrication conditions such as high contact pressure and slow sliding speed, reliability of relevant parts is improved and the construction machine has a longer service life.

Advantages of the Invention

According to the present invention, the shaft part that is in sliding contact with the bush has the grease feeding pathway in communication with the sliding surface of the bush so that it is possible to feed the grease to the sliding surface of the bush from the outside in a desired manner. Also, because the bush is formed from the porous sintered metal and the decomposition catalyst is provided at the sliding surface of the bush, the grease supplied to the sliding surface of the bush is decomposed by the decomposition catalyst and the base oil is separated. Then the base oil can easily penetrate the bush from the sliding surface of the bush and is retained in the pores of the bush. Consequently, it is possible to maintain excellent lubrication performance for a long period of time without bush replacing work and lubrication oil impregnating work. Further, because the porosity of the sintered metal for retention of the lubrication oil can be small, the bush has excellent strength.

MODE FOR CARRYING OUT THE INVENTION

Embodiments according to the present invention are now described with reference to the accompanying drawings.

Figure 1:
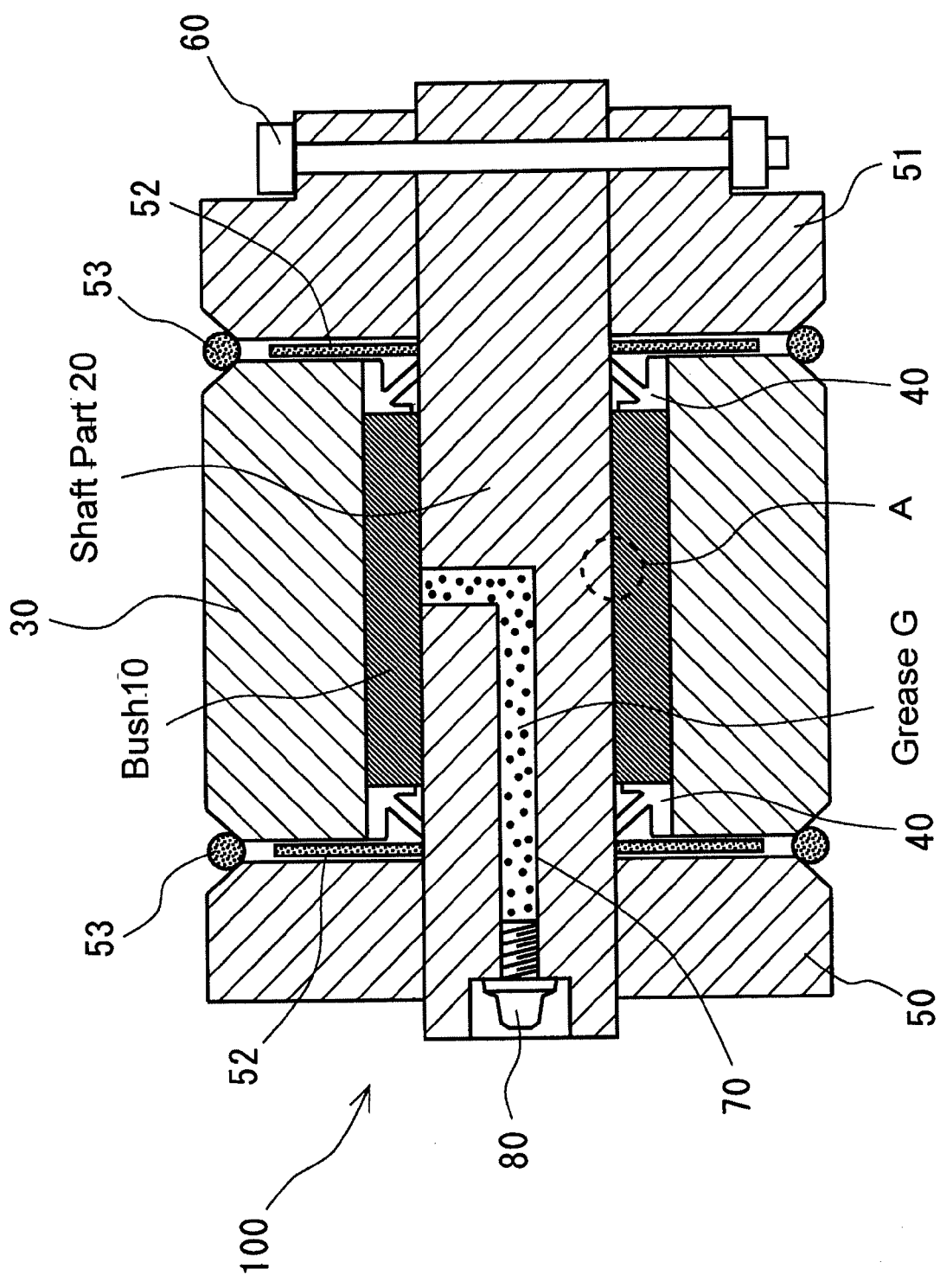
FIG. 1 is a vertical cross-sectional view of a sliding bearing 100 according to one embodiment of the present invention.

FIG. 1 shows a vertical cross-sectional view of one embodiment of a sliding bearing 100 according to the present invention. In the drawings, reference numeral 10 designates a cylindrical bush with both ends open. A circular-rod-shaped shaft part 20 rotatably extends through an axial hole of the bush 10. The inner surface of the bush 10 is in sliding contact with the outer surface of the shaft part 20 under a high contact pressure (for example, several MPa to several tens of MPa) at a slow speed (for example, 3.0 m/min or less), and these surface define the sliding surfaces.

The bush 10 is received in a boss 30. Inside the boss 30, dust seals 40 and 40 are press-fitted at both ends of the bush 10 respectively to prevent invasion of foreign matters. Brackets 50 and 51 are provided at both end faces of the boss 30 respectively, and shims 52 and 52 are interposed in respective gaps between the ends of the boss and the brackets. O-rings 53 and 53 are provided at the outer peripheries of the gaps respectively. It should be noted that the boss 30 and the bush 10 may be fixedly engaged with each other by any method well-known to a person skilled in the art, for example, shrinkage fitting or cold fitting.

The shaft part 20 extends through the brackets 50 and 51, which are situated near the ends of the shaft part, and one end of the shaft part is non-rotatably fixed by a rotation prevention bolt 60 that extends through one of the brackets 51 in a diameter direction of the bracket. A grease feeding pathway 70 is formed in the shaft part 20 such that it extends from one end face of the shaft part to a lateral face of the shaft part, and the grease feeding pathway 70 is filled with grease G. A grease nipple 80 is screwed into one end of the grease feeding pathway 70 such that the grease feeding pathway is sealed by the grease nipple 80, and the easy feeding of the grease G from the outside into the grease feeding pathway 70 is made possible by removing the grease nipple. The grease G in the grease feeding pathway 70 reaches the sliding surfaces of the shaft part 20 and bush 10 at the exit of the pathway, and lubricates the sliding surfaces.

The bush 10 is formed from a porous sintered metal having an iron (Fe) component 90 wt % or more with porosity 2-10 Vol %. It should be noted that the bush 10 having the above-described conditions may easily be made by a method that is well known to a skilled person. Specifically, the bush can easily be obtained by putting an alloy powder consisting of iron powder 90 wt % or more and cupper 10 wt % or less, for example, into a cylindrical mold as a starting material in the form of an aggregated body, and heating this aggregated body for a predetermined period at a temperature lower than a melting point of the iron powder. The porosity thereof can easily controlled by adjusting a powder diameter of metallic powder to be used, for example. Preferably the inside pores may communicate with each other at the surface.

Figure 2:
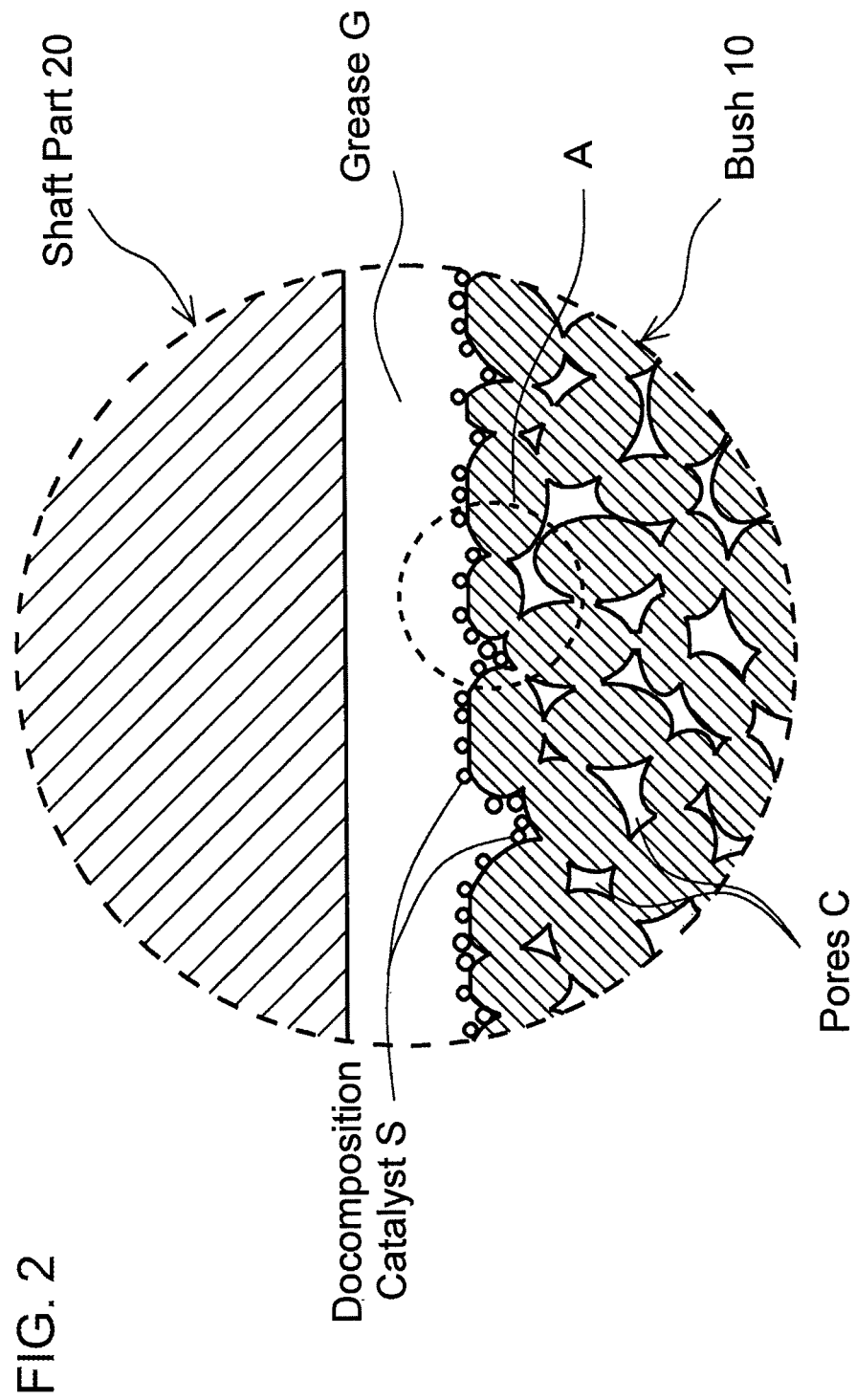
FIG. 2 is a schematic enlarged view showing part A in FIG. 1.

As illustrated in FIG. 2, a decomposition catalyst (catalytic reduction catalyst) S adheres, in the form of particles, to the sliding surface of the bush 10 to separate a base oil from the grease G. Any known catalytic reduction catalyst may be used as the decomposition catalyst S as long as the catalyst can decompose a soap, which is a thickening agent in the grease, and such catalyst may include platinum (Pt), palladium (Pd), nickel (Ni), chromium (Cr), magnesium (Mg), vanadium (V) and bismuth (Bi). Thus, the grease G used in the present invention has a soap as the thickening agent that will be decomposed by the decomposition catalyst (catalytic reduction catalyst) S, and its base oil is separated upon decomposition of the soap. Common examples of the grease G that has the soap as the thickening agent include calcium soap grease, calcium complex soap grease, sodium soap grease, aluminum soap grease and lithium soap grease.

With the sliding bearing 100 of the present invention having the above-described configuration, it is possible to easily feed the grease G to the sliding surfaces of the shaft part 20 and the bush 10 from the outside (the end of the shaft part 20) through the grease feeding pathway 70, and as shown in FIG. 2 the grease G supplied on the sliding surfaces directly permeates the bush, which is a sintered metal, from the surface (sliding surface) of the bush 10 and is retained in the pores C inside the bush. The grease G retained in the pores C seeps onto the entire sliding surfaces due to friction heat or the like and creates a thin oil film between the sliding surface of the bush 10 and the sliding surface of the shaft part 20 so that it serves to reduce friction between these sliding surfaces.

In addition, as described above, the decomposition catalyst (catalytic reduction catalyst) S, such as platinum, in the form of particles adheres to the sliding surface of the bush 10 so that the soap, which is the thickening agent, is decomposed when part of the grease G supplied onto the sliding surface of the bush 10 contacts the decomposition catalyst (catalytic reduction catalyst) S. As a result, the base oil having a low viscosity is separated from the grease G and easily penetrates the porous bush 10 from the sliding surface of the bush such that the base oil is retained inside the bush.

Specifically, although the base oil contained in the grease G, which is used as the lubrication agent, is generally difficult to be separated under the presence of the soap, which is the thickening agent, the soap is decomposed and the base oil is separated as the grease G contacts the decomposition catalyst S such as platinum. The base oil consecutively soaks into the interior of the bush as long as the pores C in the bush 10 have room.

Because the base oil has a lower viscosity than the high-viscosity grease G that contains the thickening agent, the base oil can readily soak into the porous bush 10 from the sliding surface of the bush, and capillary phenomenon can cause the base oil to spread and reach a deeper layer through the inside pores C such that the base oils is preserved there. Consequently, an amount of the lubrication agent G to soak into the bush 10 increases and an amount of lubrication agent to seep on the bush increases, and therefore further improvement is achieved in lubrication performance. As such, even if the base oil which initially soaked into the bush 10 is consumed due to sliding or other reasons, the base oil is consecutively supplied to the bush 10 and retained in the bush as long as the lubrication agent G is supplied from the grease feeding pathway 70.

Unlike the conventional structure, therefore, the lubrication oil shortage does not occur even if the bush 10 is not replaced, and it is possible to maintain excellent lubrication performance over a long period of time. In other words, when the lubrication agent G retained in the grease feeding pathway 70 decreases, the grease nipple 80 is unscrewed and new grease G is supplied into the grease feeding pathway 70 from the opening so that it is possible to always maintain a sufficient amount of grease G. Because the grease G in the grease feeding pathway 70 is gradually consumed and decreased, periodic supplementation is necessary, but the supplementation work is easy because it only requires the supplying (pumping) of the grease G.

Unlike the conventional arrangement, the grease G is supplied to the sliding surfaces of the shaft part 20 and the bush 10 from the grease feeding pathway 70, and therefore it is not necessary to impregnate the bush 10 with the lubrication oil beforehand. As such, the lubrication oil impregnation work is unnecessary, and the grease does not fly around during the mounting of the bush 10. This makes the handling easier.

Because the bush 10 is a porous sintered metal with iron (Fe) 90 wt % or more and porosity 2-10 Vol % so that the bush contains more iron and has a lower porosity than a conventional bush, the bush is able to possess remarkable strength and does not easily break even when a high pressure is applied. The reason why the Fe component of the sintered metal is 90 wt % or more is because the 90 wt % or more Fe component generally imparts a sufficient strength to the bush as a high contact pressure bush. The reason why the porosity is 2-10 Vol % is because the porosity over 10 Vol % is a too large porosity and considerably lowers the strength of the sintered metal and because the porosity less than 2 Vol % makes an amount of the lubrication agent preserved in the sintered metal too small and a sufficient lubrication performance is not obtained.

If a known surface hardening treatment is applied during the manufacture of the bush 10, a wear resistance of the bush may be enhanced. Specifically, after the sintered metal (bush 10) having iron as its main component is prepared by the above-described known manufacturing method, the sintered metal may undergo cementation, nitriding and induction quenching and subsequently undergo a chemical conversion method (e.g., with zinc phosphate, manganese phosphate or the like) or a gas sulfurizing method to form a cementation-hardened layer of 1-3 mm, preferably about 2 mm, on the surface (sliding surface) of the bush for enhancement of the wear resistance of the bush 10. If a similar surface modification treatment is applied to the shaft part 20, the wettability between the sliding surface of the shaft part and the lubrication agent G is improved so that lubrication performance and sliding performance are enhanced.

If ceramic particles or sulfur compound particles having greater hardness than a steel material of the shaft part 20 is included 1-3 wt % in the sintered metal of the bush 10 for prevention of wear and improvement of slidability, then the wear resistance of the bush is dramatically enhanced.

The ceramic particles to be contained in the sintered metal of the bush 10 are not limited to any particular particles as long as the particles can improve the wear resistance of the bush, and may include for example zirconia ($ZrO_2$), alumina ($Al_2O_3$), silicon carbide (SiC), and silicon nitride ($Si_3N_4$). Also, the sulfur compound particles are not limited to any particular compound particles, and may include for example copper sulfide (CuS) particles. Preferably the content of the ceramic particles and sulfur compound particles is 1-3 wt %. If the content is less than 1 wt %, sufficient wear resistance and slidability cannot be expected, and if the content is greater than 3 wt %, aggression to the shaft part 20 which is a corresponding sliding member becomes large and it may excessively make the corresponding member worn down and deteriorate the slidability that would cause more wear and abrasion. Also the particle size is not limited to any particular size, but preferably the particle size is between several micrometers and several hundred meters. Further, plural kinds of particles may be compounded or mixed, and the compounding ratio or the mixing ratio is not limited to any particular ratio. It should be noted that if the ceramic particles that have greater hardness than the steel of the shaft part 20 are contained in the bush 10, it seems that the ceramic particles would accelerate the wear and abrasion of the shaft part 20, but this would not cause a problem because the amount of such particles is very small (1-3 wt %).

Figure 3:
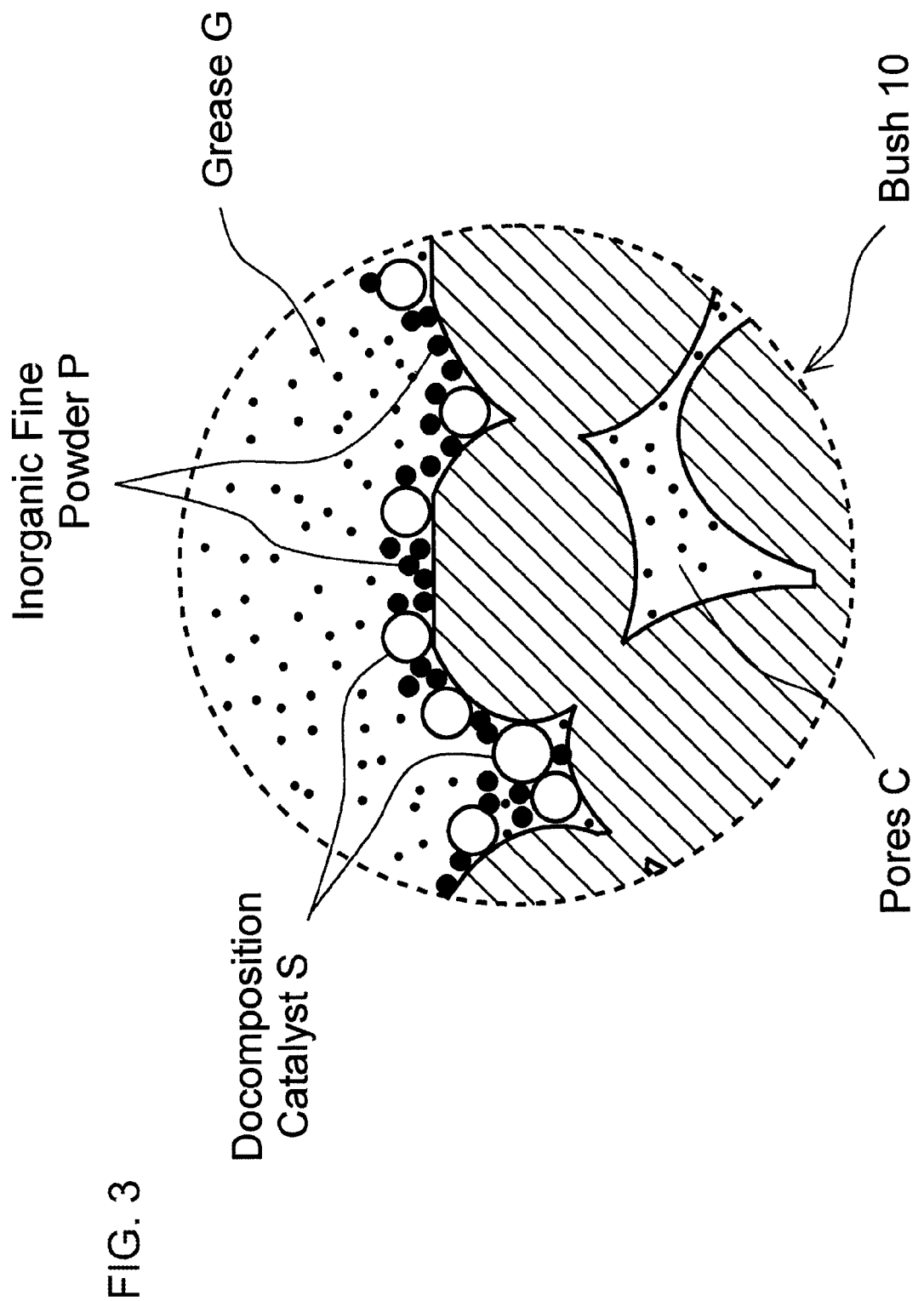
FIG. 3 is a schematic enlarged view of part A in FIG. 2.

As shown in FIG. 3, if an oil-absorbing inorganic fine powder P is made adhered (applied) to the sliding surface of the sintered metal of the bush 10 with a binder (not shown), the grease G supplied to the sliding surface of the bush 10 is attached to the bush 10 by the oil-absorbing inorganic fine powder P and sticks to the bush. Thus, the grease effectively soaks into the bush 10 and is easily preserved in the pores C of the bush. For this reason, it is preferable that, as shown in the drawing, the inorganic fine powder P exists not only on the surface (sliding surface) of the bush 10 but in the pores C of the bush 10. Nevertheless, it is satisfactory that the inorganic fine powder may only exist on the surface (sliding surface) of the bush 10. Preferably the binder itself can absorb and retain the base oil, and particularly hydroxystearic acid salt may be used as the binder. It should be noted that the binder may be employed not only to attach the inorganic fine power P but to attach the decomposition catalyst (particles) S together with the inorganic fine powder P.

Figure 4:
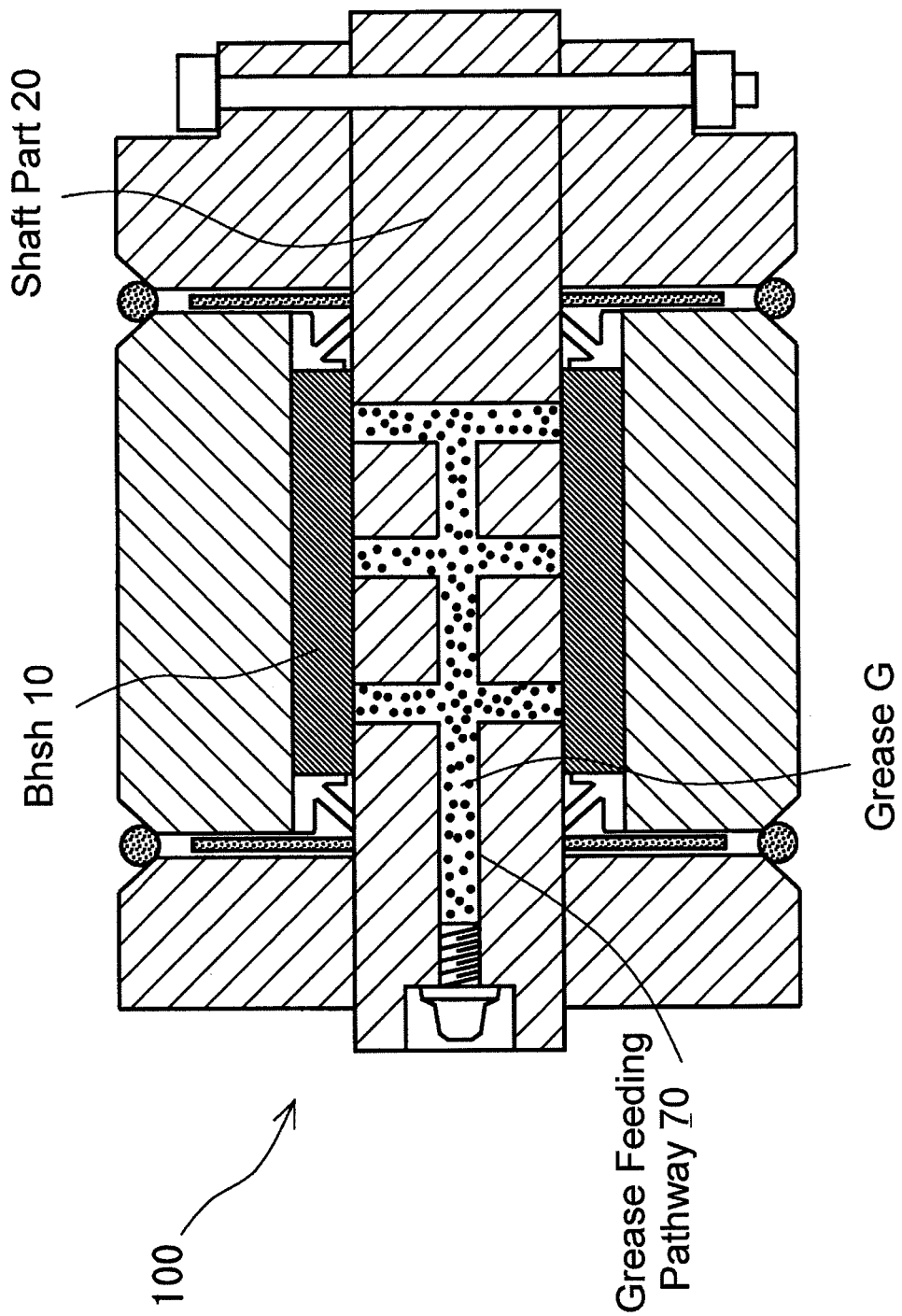
FIG. 4 is a vertical cross-sectional view of a sliding bearing 100 according to another embodiment of the present invention.

As shown in FIG. 4, the grease feeding pathway 70 formed in the shaft part 20 may be branched to a plurality of sub-pathways extending to the sliding surface such that the exits of these sub-pathways open at equal distances. Then, it is possible to efficiently and evenly supply the grease G to the sliding surface.

Figure 5:
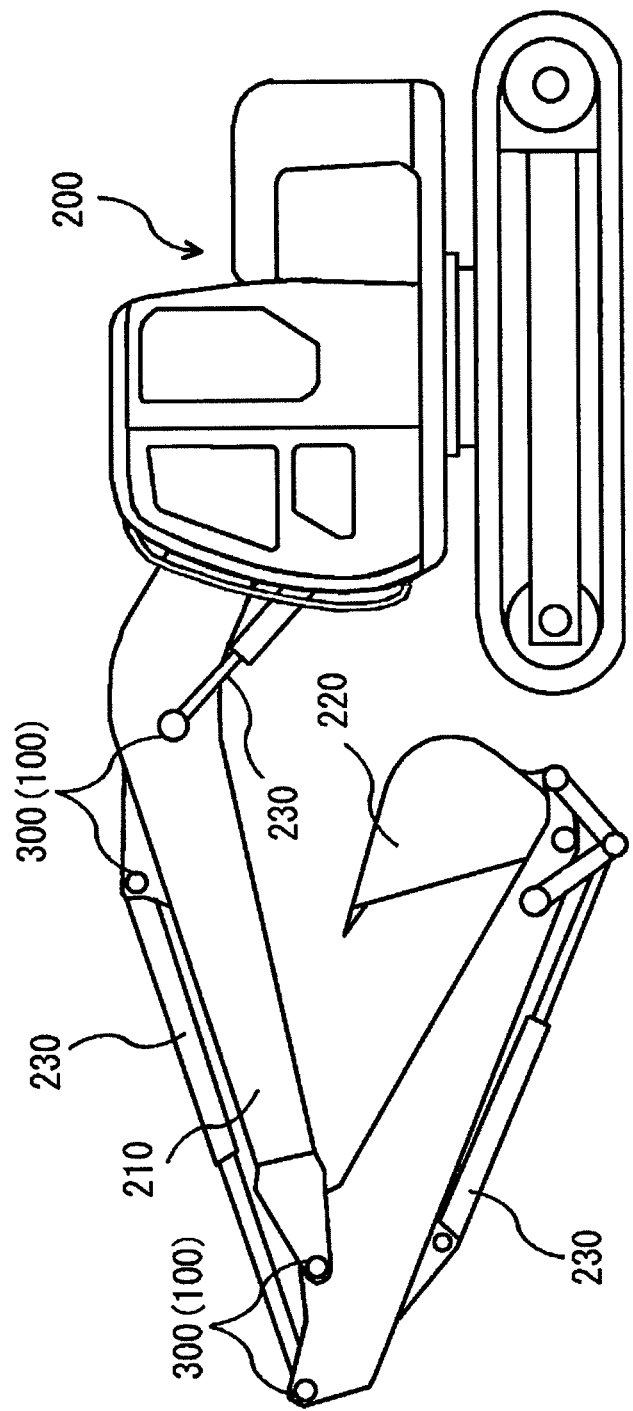
FIG. 5 illustrates an example of a construction machine (hydraulic excavator or power shovel) equipped with the sliding bearings 300 (100).

By employing the sliding bearings 100 of the invention, which have the above-described configuration, as the sliding bearings 100 of the construction machine (hydraulic excavator) 200 that is used under the severe lubrication conditions such as high contact pressure (50 MPa or more) and slow sliding speed (3.0 m/min or less) as shown in FIG. 5, it is possible to provide a construction machine (hydraulic excavator) that has high reliability at the bearing portions and long service life.

When the sliding bearings 100 of the invention are installed in the construction machine 200 as shown in FIG. 5, the bushes 10, which are not impregnated with grease G, are used and the grease feeding pathway 70 of the shaft part 20 is filled with the grease G after the installation. By doing so, the flying around of the oil/grease during the installation of the bushes 10 is avoided and the oil/grease impregnation work becomes unnecessary. It should be noted, however, that the sliding surface of the bush 10 or the entire bush may be impregnated with the grease G beforehand, and such bush 10 may be installed in the construction machine. In the latter approach, the oil/grease impregnation work becomes necessary in advance, but the time for the grease G to soak in the bush 10 after the installation becomes unnecessary and this brings about an advantage that the construction machine can operate immediately. In the latter approach, the new grease G is consecutively supplied after the installation, and therefore the same advantage as the former approach is obtained, i.e., grease shortage due to the consumption of the impregnated oil is avoided.

It should also be noted that although the decomposition catalyst S in the sliding surface of the bush 10 is caused to adhere to the sliding surface of the bush by the binder in the above-described embodiment, the decomposition catalyst may be sintered in the bush surface during preparation of the sintered metal so that the decomposition catalyst becomes integral with the bush.

REFERENCE NUMERALS AND SYMBOLS

10: Bush (Sintered Metal)
20: Shaft Part
30: Boss
40: Dust Seal
50, 51: Brackets
52: Shim
53: O-ring
60: Rotation Preventing Bolt
70: Grease Feeding Pathway
80: Grease Nipple
100: Sliding Bearing
200: Construction Machine (Hydraulic Excavator)
210: Arm
220: Bucket
230: Hydraulic Cylinder
C: Pores
G: Grease
P: Inorganic Fine Powder
S: Decomposition Catalyst (Catalytic Reduction Catalyst)

The invention claimed is:

1. A sliding bearing comprising:
a bush formed from a porous sintered metal;
a shaft part inserted in an axial bore of the bush such that the shaft part slides relative to the bush;
a grease for lubricating a sliding surface of the shaft part and a sliding surface of the bush;
a grease feeding pathway formed in the shaft part for feeding the grease to the sliding surface of the shaft part and the sliding surface of the bush from outside; and
a decomposition catalyst provided in the sliding surface of the bush for decomposing the grease to separate a base oil.

2. The sliding bearing according to claim 1, wherein the bush is a porous sintered metal having a porosity of 2-10 Vol %.

3. The sliding bearing according to claim 2, wherein an inorganic fine powder having an oil absorbing property is provided such that the inorganic fine powder adheres to the sliding surface of the bush.

4. A construction machine equipped with a high-contact-pressure and low-sliding-speed sliding bearing that has a contact pressure of 50 MPa or more and a sliding speed of 3.0 m/min or less, said sliding bearing being a sliding bearing according to claim 2.

5. The sliding bearing according to claim 1, wherein an inorganic fine powder having an oil absorbing property is provided such that the inorganic fine powder adheres to the sliding surface of the bush.

6. The sliding bearing according to claim 5, wherein the inorganic fine powder consists of sulfur compound particles.

7. The sliding bearing according to claim 5, wherein the inorganic fine powder is a compound of ceramic particles and sulfur compound particles.

8. The sliding bearing according to claim 5, wherein the inorganic fine powder adheres to the sliding surface of the bush with a binder.

9. A construction machine equipped with a high-contact-pressure and low-sliding-speed sliding bearing that has a contact pressure of 50 MPa or more and a sliding speed of 3.0 m/min or less, said sliding bearing being a sliding bearing according to claim 1.

\* \* \* \* \*